(No Model.)

C. D. TISDALE.
NUT LOCK.

No. 439,212. Patented Oct. 28, 1890.

WITNESSES
Geo. E. Fowle Jr.
Carrie E. Nichols

INVENTOR
Chas. D. Tisdale.
Per Edwin W. Brown
Attorney.

UNITED STATES PATENT OFFICE.

CHARLES D. TISDALE, OF BOSTON, MASSACHUSETTS.

NUT-LOCK.

SPECIFICATION forming part of Letters Patent No. 439,212, dated October 28, 1890.

Application filed February 20, 1890. Serial No. 341,097. (No model.)

*To all whom it may concern:*

Be it known that I, CHARLES D. TISDALE, of Boston, in the county of Suffolk and State of Massachusetts, have invented certain new and useful Improvements in Nut-Locks, of which the following is a full, clear, and exact description.

This invention relates to improvements in nut-locks more particularly intended for use on steam-railroad tracks; and the invention consists of a lock for nuts constructed and applied substantially as hereinafter fully described, reference being had to the accompanying sheet of drawings, in which is illustrated a nut-lock constructed in accordance with this invention and its mode of application.

Figure 1:
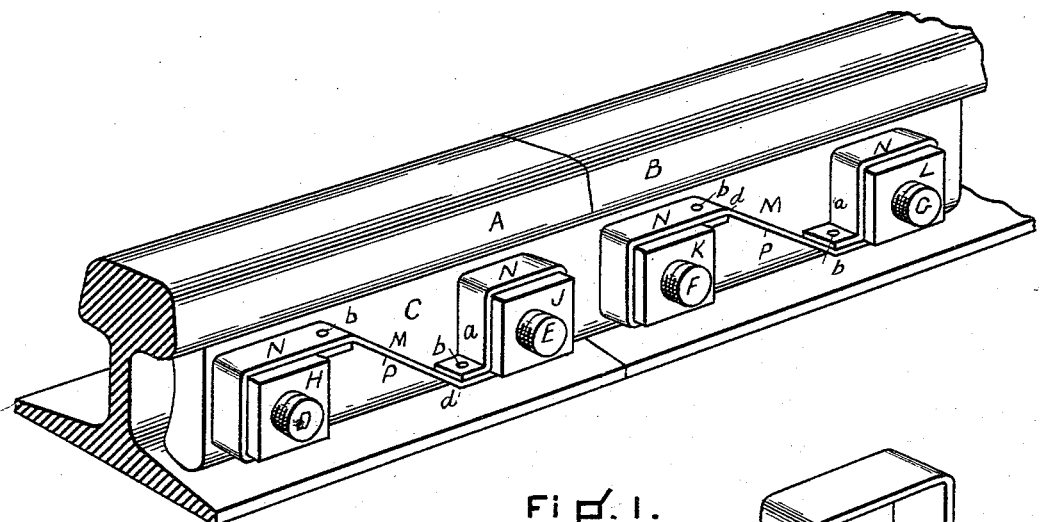
Figure 2:
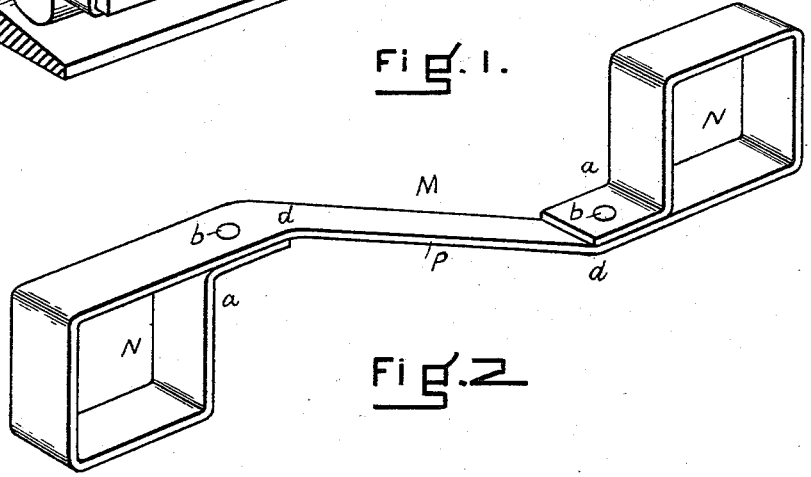

Figure 1 is a view in perspective and cross-section of the meeting ends of a rail on a steam-railroad track secured together by their fish-plate, bolts, and nuts, and with the present invention applied thereto. Fig. 2 is a perspective view of the nut-lock itself.

In the drawings, A and B represent the ends of two rails of a steam-railroad track secured together at such ends by the fish-plate C and bolts D E F G and screw-nuts H J K L, all substantially as is well known, and needing no particular description herein.

M is the present device for locking the two screw-nuts to each rail, and it is made of a flat strip of iron or of any suitable metal, preferably of a little less width than the thickness of the nuts, and each end *a* is bent over upon itself in the form of a square, as at N, respectively on the reverse sides of the strip, and secured to its respective side of the strip by a rivet *b*, the strip being bent slightly in a diagonal direction at *d*, where it is secured at its end toward its square, so that the squares will be in the same plane, and connected by the central portion P of the strip in a diagonal direction, as shown. The internal size of each square N is large enough to closely fit on the nut to which it is to be applied.

In applying this nut-lock the fish-plate C is placed against the side of the two rails and the bolts inserted and nuts screwed onto their ends firmly and tightly against the fish-plate and are left square with each other, and then a locking device M is placed by its squares over the two nuts to each rail and driven close up against the fish-plate, as shown in Fig. 1.

The fit of the square portions on each nut should be very close and tight in order to hold the device in place by its friction thereon, although it can be secured from accidental detachment in any suitable manner.

With this device applied to two nuts to the securing-bolts of the rail neither one of the nuts can turn to unloosen without being prevented by the other, and in case either should be inclined to turn to unscrew, it will by the connecting portion P of the two squares pull upon the other square in such manner as to tend to move its nut in a direction to tighten, which would be impossible, for the reason that the nut being already tight it could not be moved in such direction, and consequently the nut inclined to unscrew would be prevented and held stationary, and in such case, as is plain, both nuts would be held tight and immovable, thus securing what is desired by this invention—a sure and reliable nut-lock.

The strip can be of any suitable metal, and the ends secured to the body portion after being bent over in any suitable manner.

The portion N, instead of being square, can be bent into any shape, according to the bolt or screw-nuts to which it is to be applied, and the device can be applied to nuts securing other parts together than rails of steam-railroad tracks, as is obvious.

A nut-lock constructed in accordance with this invention is very simple, easily applied and secured, and costs but a trifle.

Having thus described my invention, what I claim is—

1. A nut-lock composed of a strip of metal having its ends respectively bent in the reverse direction to fit the nuts to which it is to be applied and secured to the body portion of the strip.

2. The combination, with two nuts of bolts securing a plate to a railroad-track, of a lock composed of a strip of metal having its ends respectively bent in the reverse direction to fit said nuts and secured to the body portion, for the purpose specified.

In testimony whereof I have hereunto set my hand in the presence of two subscribing witnesses.

CHARLES D. TISDALE.

Witnesses:
EDWIN W. BROWN,
CARRIE E. NICHOLS.